Aug. 29, 1967

E. UHLMANN 3,339,083

REGULATION OF THE ALTERNATING VOLTAGES
IN A DIRECT CURRENT POWER TRANSMISSION

Filed Aug. 26, 1966

INVENTOR.
Erich Uhlmann

BY
Bailey, Stephens & Huettig
ATTORNEYS

Aug. 29, 1967

E. UHLMANN 3,339,083

REGULATION OF THE ALTERNATING VOLTAGES
IN A DIRECT CURRENT POWER TRANSMISSION

Filed Aug. 26, 1966

INVENTOR.
ERICH UHLMANN

Bailey, Stephens + Huettig
ATTORNEYS

United States Patent Office 3,339,083
Patented Aug. 29, 1967

3,339,083
REGULATION OF THE ALTERNATING VOLT-
AGES IN A DIRECT CURRENT POWER
TRANSMISSION
Erich Uhlmann, Ludvika, Sweden, assignor to Allmänna
Svenska Elektriska Aktiebolaget, Vasteras, Sweden, a
Swedish corporation
Filed Aug. 26, 1966, Ser. No. 575,938
Claims priority, application Sweden, Mar. 20, 1962,
3,061/62
5 Claims. (Cl. 307—83)

ABSTRACT OF THE DISCLOSURE

Alternating current voltage regulating means for regulating the A.C. voltages connected to the rectifiers of the converter stations of an HVDC power transmission system.

Figure 1:
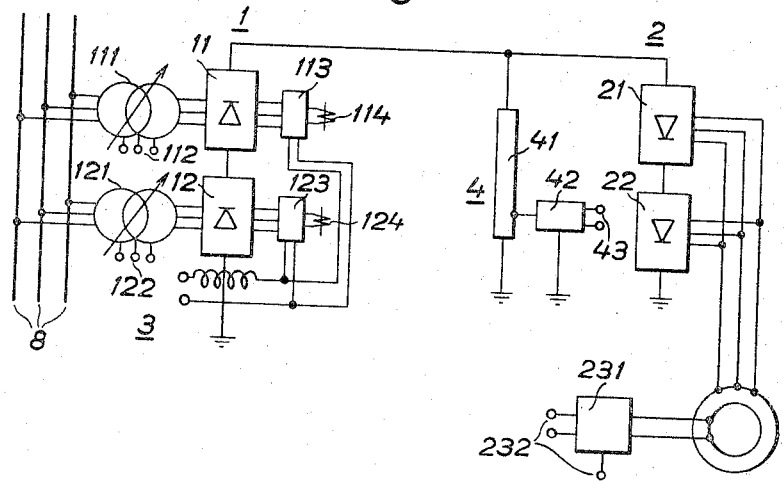

This regulating means may comprise tap selectors on the converter transformers of a station or a voltage regulating means on a synchronous machine connected to a station. In one of said stations where the delay angle of the rectifiers is controlled with respect to a certain desired transmission magnitude said A.C. voltage regulating means is operated with respect to the deviation of said delay angle from a certain desired value. In another of said stations where the delay angle of the rectifiers is given according to a certain programme, said A.C. voltage regulating means is operated with respect to the deviation of the direct transmission voltage from a certain desired value.

---

The present invention relates to a method of regulating the alternating voltages in a direct current power transmission with converters between two alternating current networks, and regulating equipment according to said method.

If it is desired to connect two alternating current networks by means of a direct current power transmission, the voltages in these networks are usually given. In the power transmission itself, however, it is desirable to be able to vary the direct voltage freely with respect to the most suitable type of operation while at the same time the direct voltage is dependent upon connection and disconnection of converters in the two converter stations. As a result of this, therefore, the alternating voltages arising on the A.C. sides of the converter stations must be adapted to the alternating voltages in the connected A.C. networks. With larger A.C. networks such an adaptation may suitably be carried out with tap selectors on the converter transformers. If, however, one of the A.C. networks is substantially restricted to one machine, for example a generator, the voltage regulator of the converter station may quite simply be connected to the voltage regulator of said generator. In other words, the alternating voltage network itself may be adapted to the power transmission.

The invention may be used both for actual power transmissions over long distances and for converter stations combining two separate A.C. networks adjacent to each other which for some reason it is not desired to connect directly to each other.

The invention relates to such a direct current power transmission where one converter station is controlled according to a certain program and the other controlled with respect to one of the transmission variables such as current, power, frequency, etc., and a method according to the invention is characterised in that in normal operation the alternating voltage of the program-controlled converter station is controlled by the direct voltage of the transmission while the alternating voltage of the other converter station is adjusted corresponding to a certain desired control angle in this station. The alternating voltage of the program-controlled converter station may suitably be adjusted corresponding to a certain desired transmission voltage on the direct current side while the alternating voltage of the other station is adjusted corresponding to a desired control angle in this converter station.

It is clear that the above-mentioned condition covers two possibilities, that is, either that the rectifier station is program-controlled and operates with a certain delay angle, for example 0, while the grid control of the inverter station is controlled by, for example, the transmission current, or that the grid control of the rectifier station is controlled by the transmission current while the inverter station operates with a certain predetermined commutation margin, preferably that which is required under the given operation conditions.

According to the invention, in the first case the alternating voltage of the rectifier station will be adjusted with respect to the desired transmission voltage while the inverter station is adjusted corresponding to a certain desired commutation margin. This is suitably chosen so large that a reasonable increase in the EMF of the station, and thus decrease of the current, may be rapidly carried out with the grid control, but on the other hand the commutation margin should not be chosen larger than necessary to effect such a rapid control.

In the other case where the rectifier station is controlled by a transmission magnitude and the inverter station is program-controlled, the alternating voltage of the inverter station is adjusted corresponding to the desired transmission voltage while the alternating voltage of the rectifier station is adjusted corresponding to a certain desired delay angle. As with the commutation margin in the previous case, the delay angle should here be chosen so large that a rapid increase in EMF of the rectifier station and consequent current increase may be carried out but on the other hand not larger than is necessary for such a rapid current increase.

Figure 2:
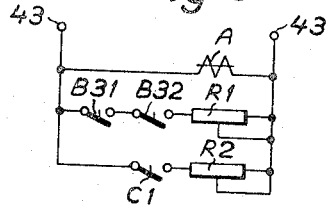
Figure 3:
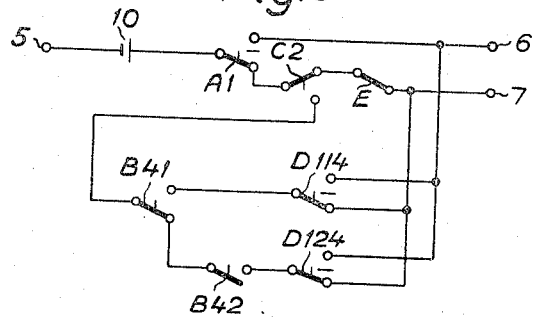

The invention will be further explained with reference to the accompanying schematical drawing where FIGURE 1 shows a D.C. transmission (shown in more detail in FIGURES 1a and 1b) while FIGURES 2 and 3 show a connection arrangement for voltage regulation according to the invention. Such a connection arrangement occurs in both the stations.

FIGURE 1 shows a D.C. power transmission comprising two converter stations 1 and 2 for connecting together two A.C. networks, one of which 8 is indicated as a normal network while the other is indicated as an A.C. machine 23, for example a synchronous generator or synchronous motor. Of course, instead of the A.C. machine 23 a normal A.C. network could also be used at this end of the power transmission. The converter station 1 comprises two converters 11 and 12 connected to the A.C. network 8, each by its own corresponding converter-transformer 111 and 121 respectively. These transformers are provided with tap selectors illustrated by arrows and three terminals, 112 and 122 respectively on each converter-transformer. These three terminals include a zero terminal and terminals for control in upward and downward directions respectively. Further, the converter station 1 is purely schematically shown provided with equipment for current control known per se comprising a current measuring member 3 in the form of a transductor which delivers a control magnitude dependent upon the direct current, to the angle control devices 113 and 123 respectively. Each of these two control devices is provided with its own relay coil 114, 124, fed with voltages corresponding to the delay angle corresponding to the current control magnitude.

Figure 1A:
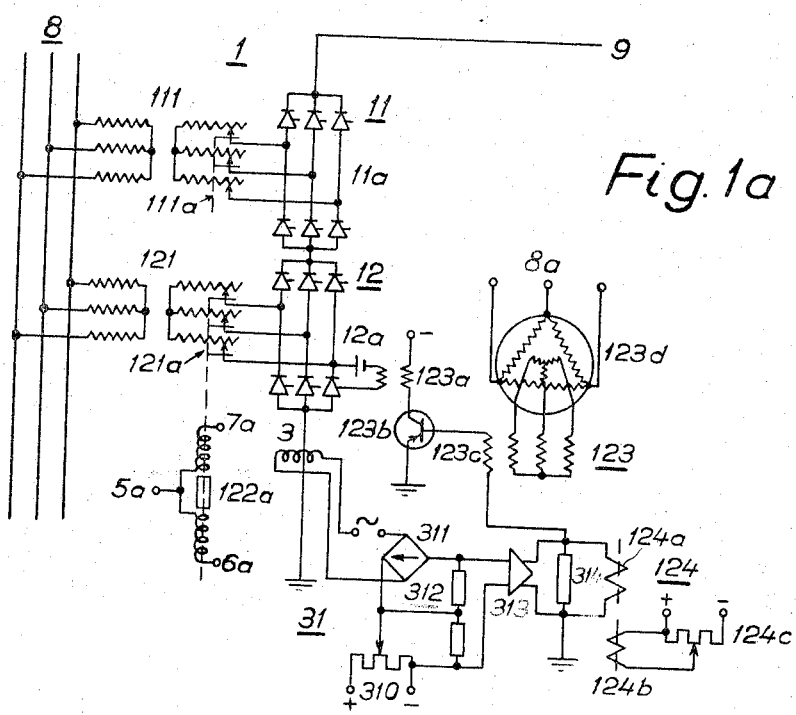
Figure 1B:
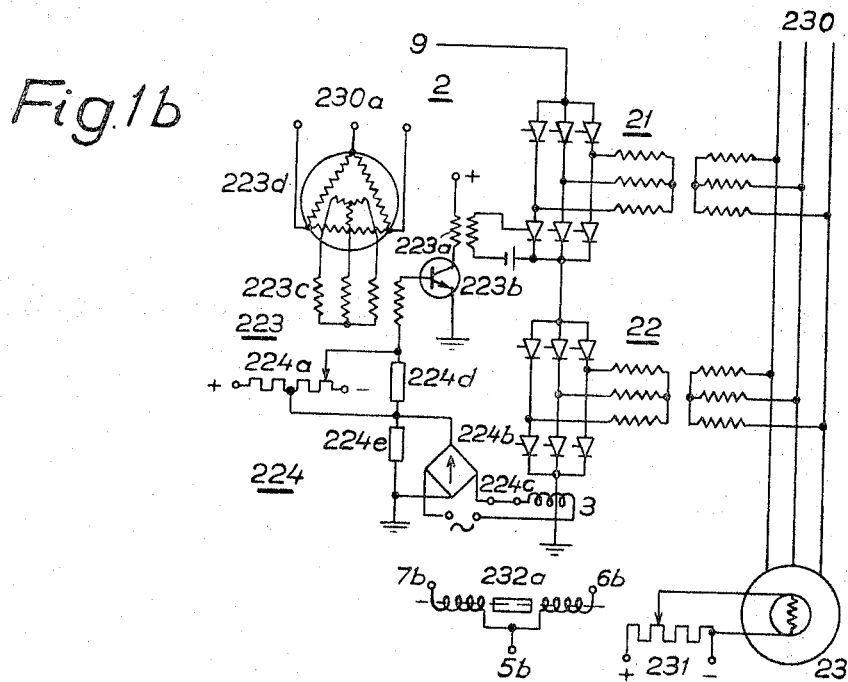

FIGS. 1a and 1b show the stations 1 and 2 respectively of FIG. 1 in more detail. The reference numbers of FIG. 1 are used in FIGS. 1a and 1b.

FIG. 1a shows the station 1 comprising two converters 11 and 12 each with a converter transformer 111, 121 respectively inserted between an A.C. network 8 and rectifier connections 11a and 12a. The converter transformers are provided with tap selectors 111a and 121a on their rectifier windings. A control device 122a is shown for the tap selector 121a, comprising a balance relay system with two counteracting relay coils having a common terminal 5a and outer terminals 6a and 7a respectively.

For one of the rectifiers of the converter 12 there is provided a delay angle control system 123 comprising a grid voltage transformer 123a, the secondary side of which is connected to the control side of the rectifier in series with a bias voltage source. The primary side of said grid voltage transformer is connected to a negative voltage source in series with a transistor 123b. The control side of said transistor is influenced from an A.C. reference voltage and a direct control voltage. The A.C. reference voltage for a rectifier is taken from the corresponding phase of a reference voltage transformer 123c connected to the network 8 through a phase shifting device, for instance a rotary phase shifter 123d, with terminals 8a and a voltage transformer not shown.

Said direct control voltage is taken from a regulator 31 which is preset according to a desired direct transmission current by means of a potentiometer 310. Said desired transmission current value may be given directly as a desired current or may be derived according to a desired transmission power or another transmission magnitude depending on other transmission magnitude not controlled from station 1. The regulator is adjusted from the actual transmission current measured by means of a transductor 3 inserted in the D.C. link 9. The transductor 3 and a rectifier bridge 311 are connected in series to an A.C. voltage source and a direct voltage proportional to the actual transmission direct current in D.C. link 9 is taken out from the bridge 311. The direct voltage from the bridge 311 and the voltage from the potentiometer 310 counteract each other over the voltage divider 312 and the difference voltage is fed to a resistor 314 through amplifier 313. When the A.C. reference voltage from transformer 123c passes beyond the direct control voltage over the resistor 314 in one direction, the transistor 123b is made conducting and a control current grows up in the grid voltage transformer 123a. In this way the delay angle of the corresponding rectifier is determined by the output direct voltage from the regulator 31 which is common to all the rectifiers of the particular converter.

Said output direct regulator voltage (which also represents the delay angle) can thus be connected to one coil 124a of a delay angle measuring relay 124, the other coil 124b of which is connected to a reference voltage from a potentiometer 124c corresponding to a certain desired delay angle.

If the actual direct transmission current measured by the transductor 3 differs from the desired transmission current preset by the potentiometer 310, the output regulator voltage across the resistor 314 will go in one or the other direction, thus modifying the delay angle of the rectifiers and thereby the direct voltage of the station 1, until the desired transmission current is obtained. At the same time the delay angle measuring relay 124 will be out of balance and influence contact D124 in FIG. 3. This means that a signal is given from the terminals 5, 6, 7 in this case to the terminals 5a, 6a, 7a in FIG. 1a so that the tap selector 121a of transformer 121 is moved in one direction or the other. Thus the A.C. voltage connected to the rectifiers will be modified in such a direction that the above mentioned variation of the direct voltage of the station is amplified. The regulator 31 will therefore be influenced in the opposite direction until the desired value of its output voltage and thus of the delay angle of the rectifiers are restored.

FIG. 1b shows the station 2 comprising two converters 21 and 22. Provided that the A.C. network 230 connected to this station only comprises the connections between the station and an A.C. machine 23, the A.C. voltage regulating means of this station can be a voltage regulator for said A.C. machine. In its simplest form this voltage regulator could be a potentiometer 231 in the exciter circuit for the field winding of said A.C. machine. Said potentiometer is controlled from a balance relay system 232a with two counteracting coils having a common terminal 5b and outer terminals 6b and 7b. These terminals correspond to terminals 232 in FIG. 1 and are connected to the corresponding terminals 5, 6, 7 in FIG. 3.

If the direct voltage of the D.C. line 9 taken out from terminals 43 in FIG. 1 differs from the desired voltage preset by means of the resistors $R_1$ and $R_2$ in FIG. 2, relay A will move contact A1 in FIG. 3 in one direction or the other, thereby influencing the balance relay 232a controlling potentiometer 231 in FIG. 1b until the output A.C. voltage of the machine 23 has such a value that the correct direct voltage in D.C. link 9 is achieved.

The direct voltage of the D.C. link 9 is not influenced from the control of the rectifiers of station 2 as these rectifiers are controlled with a relay angle corresponding to maximum EMF of the station. For a rectifier station this means the delay angle zero or a certain low limit for the delay angle. For an inverter maximum EMF is obtained by minimum commutation margin. In both cases the delay control system 223 comprises a grid voltage transformer 223a, a bias voltage source and a transistor 223b corresponding to 123a and 123b respectively in FIG. 1a. The control side of transistor 223b is influenced from an A.C. reference voltage and a direct control voltage.

The A.C. reference voltage for a rectifier is taken from the corresponding phase of a reference voltage transformer 223c connected to the network 230 through a phase shifting device, for instance a rotary phase shifter 223d, with terminals 230a and a voltage transformer not shown. Said direct control voltage is taken from a direct voltage control member 224. Said control member comprises a potentiometer 224a for presetting a direct voltage. In case of rectifier operation of station 2, said direct voltage is connected to a resistor 224d which should have approximately the same value as the amplitude of the A.C. reference voltage from reference transformer 223c. If the reference voltages are phase displaced about 90° in relation to the corresponding commutation voltages, the delay angles of the rectifiers will thus be nearly zero.

In case of inverter operation of station 2, the voltage connected to resistor 224d should be of opposite polarity to that corresponding to rectifier operation and should be less than the latter by an amount corresponding to the desired commutation margin. Besides this, attention must now be paid to the actual current of the D.C. link as the commutation time for the rectifiers is proportional to said direct current. From the direct voltage of resistor 224d, a direct voltage proportional to the load current of the D.C. link 9 must therefore be subtracted, which voltage could be taken from a transductor 3 inserted in said D.C. link, and connected in series with a rectifier bridge 224b to an A.C. voltage source. Across said rectifier bridge a direct voltage is taken out and connected to a resistor 224c, thus counteracting the voltage over the resistor 224d. This means the desired commutation margin is obtained regardless of the actual direct transmission current. In case of rectifier operation the transductor 3 is disconnected by means of a switch 224c. It is seen that the delay angle control systems 123 and 223 in FIGS. 1a and 1b are built up upon the same main principles with an A.C. reference voltage device which is almost the same in the two stations and a direct voltage control member or regulator which is different in the two stations and built up in accordance with the control principle of the particular station, depending on whether said station is a rectifier or an inverter station.

The converter station 2 is assumed to be program-controlled in a known manner, that is, controlled with a predetermined commutation margin or delay angle respectively. The converter station 2 consists of two converters 21 and 22 respectively which in the embodiment shown also include converter-transformer and program controlling arrangements. In connection with the converter station 2 is shown a voltage measuring member 4 comprising a voltage divider in the form of a high ohmic resistor 41 between the direct voltage conductor and earth, across the lower part of which a small part of the direct voltage is withdrawn and fed into an amplifier 42 from the output terminals 43 of which a voltage proportional to the direct voltage in the transmission line may be withdrawn. The A.C. machine 23 shown in connection with the converter station 2 is provided with a voltage regulator 231, the output terminals 232 of which comprises a zero terminal and terminals for voltage control in upward and downward directions respectively. In fact both the converter stations are provided with both current and voltage measuring devices and the possibility of changing over between program control and current control in known manner. However, for the sake of simplicity only one set of control equipment has been shown in each converter station. The current control shown should otherwise be regarded as an example and may be replaced by power control, frequency control or the like.

FIGURE 2 shows a voltage measuring relay A with its connection terminals 43 connected to the connection terminals 43 on the voltage measuring device 4 in FIG. 1. The relay coil A is parallel-connected with two resistors $R_1$ and $R_2$ which may suitably be adjustable as indicated. In series with the resistor $R_1$ are shown two contacts B31 and B32. The resistor $R_1$ is inserted in order to set the sensitivity of the relay coil A in relation to the number of converters connected and the contacts B31 and B32 correspond each to one converter in each station. The method of operation is that when both the converters in a station are connected, both the contacts B31 and B32 are closed. The resistance of $R_1$ is roughly the same as that of the relay coil A so that a connection of both the converters means that the sensitivity of the relay coil A will be about half what it is when only one converter is connected and the resistor $R_1$ thus disconnected. This arrangement has been introduced because the converters are parallel-connected on the A.C. side but series-connected on the D.C. side so that a disconnection of one converter by means of a by-pass valve and isolator causes the direct voltage in the transmission to correspond only to that of the remaining converter, thus demanding a corresponding alteration in the sensitivity of the relay A by disconnecting the resistor $R_1$. If each converter station comprises more than two converters, there must be corresponding possibilities of changing the sensitivity of the relay A. To be exact, with $n$ converters $n-1$ shunt circuits are required to obtain a number of adjustments of sensitivity in the relay A corresponding to the number of converters. The resistor $R_2$ is inserted in order to adjust the sensitivity of the relay A in relation to whether the converter station in question is operating as a rectifier or as an inverter. In order to reach a marginal adjustment in the power transmission the contact C1 in series with the resistor $R_2$ is closed if the converter station operates as a rectifier and open if the station operates as an inverter. The resistor $R_2$ is thus adapted in relation to the resistance of the relay coil A in such a way that the desired marginal adjustment is obtained.

In FIGURE 3 is shown a connection controlled by the relay A, for operating the voltage regulating means in the pertinent converter station. FIGURE 3 shows a zero terminal 5 and two output terminals 6 and 7, one of which corresponds to a decrease in voltage on the A.C. side of the converter station while the other corresponds to an increase of said voltage. This operating system is fed from a voltage source 10. Change-over between the two output terminals 6 and 7 is produced by means of a two-way contact A1 with neutral position controlled by the relay coil A. The terminals 5, 6, 7 are connected in station 1 to the terminals 112 and 122 and in station 2 to the terminals 232.

As mentioned, this equipment is present in both the stations regardless of whether the station in question is program-controlled or current-controlled (power-controlled) and change-over of the equipment for program-control or current control is done by means of the contact C2 which in the position shown corresponds to program-control. As mentioned earlier, the alternating voltage of the program-controlled converter station is suitably adjusted corresponding to a certain desired transmission voltage on the D.C. side, which voltage is measured by the relay A. If the program-controlled station operates as a rectifier, the shown position of the contact A1 corresponds to low transmission voltage, so that the contact A1 is in off-position. The output terminal 7 receives voltage and orders an increase in voltage in the pertinent voltage regulator, i.e. the voltage regulator 231 or in the tap selectors of the converter-transformers 111 and 121. The terminal 6 receives voltage when the relay is in its on-position, i.e. when the voltage is too high. At the desired voltage, the relay is in its neutral position. If the current controlled station operates as an inverter the conditions are reversed.

In the current-controlled converter station the alternating contact C2 is in its lower position. It is pointed out that the adjustment of the contacts C1, A1 and C2 in relation to each other, as well as the purpose of the terminals 6 and 7, is dependent upon whether the program-controlled converter station operates as a rectifier or an inverter. The shown position of the contact A1 in relation to C1 and C2 relates to the case when the inverter is current-controlled and the rectifier program-controlled, while reversed conditions would correspond to reversed adjustment of the contact A1 and change-over of 6 and 7.

If it is assumed that the current controlled station operates as a rectifier, i.e. the contact C1 is closed, A1 will be in the position shown while at the same time the alternating contact C2 will be in its lower position. Because of the decreased sensitivity of the relay A, thus, the direct voltage will be too low so that the contact A1 will be in increase-position, i.e. off-position as shown. However, this gives no voltage to the terminal 7 since the alternating contact C2 is in its lower position. On the other hand the voltage from the voltage source 10 will be fed to one of the alternating contacts D114 or D124 which are controlled by the relay coils 114 and 124 respectively in FIGURE 1. Connection of said two alternating contacts is done by means of the contacts B41 and B42 which are connected dependent upon which of the converters 11 and 12 is connected. It is clear from the drawing that the alternating contact B41 is more important than the contact B42, so that the alternating contact D124 is only connected when only the corresponding converter is connected.

As mentioned the alternating contacts D114 and D124 are controlled in relation to the delay angle occurring in the converter in question and a decreased transmission direct current will in a known manner with the help of the current indicating device 3 give the order for a decreased delay angle for the two converters 11 and 12. However, in order to try to maintain the control angle of the converters in the current controlled converter station at a suitable value, the altered delay angle causes an altered adjustment of the alternating contacts D114 and D124, due to which a corresponding order regarding altered voltage on the A.C. side of the converter station is obtained through the terminals 6 or 7. In this way a current alteration in the D.C. transmission will in the first place given an altered delay angle on the control grid in the transmission, but upon a sufficiently great alteration of said delay angle an impulse will be sent to the tap selectors of the converter-transformers in question after which the delay angle will be brought back to around the desired value.

In order to further clarify the process under normal and abnormal voltage conditions it may be assumed in the first place that the same number of converters is in operation in both the converter stations. In the program-controlled converter station the contact C2 is in the position shown. Depending on when one or two converters are connected in each converter station, the relay A will be controlled by whole or half voltage and due to this the alternating contact A1 will deliver impulses through the terminals 6 and 7 to the voltage regulating device 231 in upward or downward direction until the desired whole or half transmission voltage is obtained on the D.C. cable.

In the current-controlled converter station the alternating contact C2 is in its lower position. According to whether this station is in rectifier or inverter operation the marginal adjustment contact C1 is either closed or open. If this station is operating as a rectifier the relay A will find the voltage too low while if the station is operating as an inverter the relay A will find the voltage too high. In either case the alternating contact A1 is arranged to move to the lower position shown. The terminals 6 and 7 thus receive no direct impulse, but voltage from the voltage source 10 flows through the contacts A1 and C2 to the alternating contact B41. If the corresponding converter, that is the converter 11, is connected, the contact B41 will be closed, that is voltage from the source 10 will be transmitted to the alternating contact D114. Regardless of whether the converter 12 is connected or not, it is in this case the relay 114, or in other words the delay angle from the angle control device 113, which controls the converter station with the help of the alternating contact D114. Thus control impulses will be transmitted through the alternating contact D114 and the terminals 6 and 7 to the winding connections on the converter-transformers 111 and 112 until the desired delay angle is obtained in the converter station and the alternating contact D114 goes to its central position.

If one converter is in operation in the program-controlled converter station and two converters are in operation in the current-controlled station, the situation will be as follows. In the program-controlled station the relay A will have a sensitivity corresponding to half the operation voltage and the voltage regulation of this station will be in proportion to this. On the current-controlled side the current measuring device will decrease the voltage on the converter until the desired current is obtained, which means that each series-connected converter operates with approximately half voltage. This causes a relatively large delay angle or commutation margin respectively, which in turn means that the tap selectors, through the terminals 6 and 7 and the delay angle regulated alternating contact D114, receive an order to decrease the voltage so that the control angle or commutation margin respectively falls to the desired value. However, the tap selectors will generally not be equipped with such a large regulating range and they therefore move to their lowest position. The delay angle or commutation margin will in this case be not quite as low as desired, but this is permissible.

If it is now assumed that two converters are in operation in the program-controlled converter station while in the current-controlled station one converter is in operation, the situation will be as follows.

If the inverter station is program-controlled and the rectifier station current-controlled the relay A in the first mentioned station, whose sensitivity is adjusted to correspond to two operating converters, will find that the voltage delivered from one converter in the rectifier station is too low, so that the relay will be in off-position and an increase-impulse is transmitted through the terminal 7 to the alternating voltage regulation. If this is not dimensioned with an extremely large regulating range, however, it will be impossible to effect the desired voltage.

On the rectifier side a sub-converter cannot give full transmission voltage corresponding to that desired on the inverter side, which means that no transmission current will flow even if the rectifier station receives the control angle zero. In this case, therefore, the alternating voltage regulation range generally is not provided that full transmission direct voltage may be obtained. The result is that the alternating voltage regulation in both the stations moves to the upper position without obtaining such voltage conditions that a transmission current is able to flow.

Before this, however, something else has taken place. As mentioned before, the inverter station is also provided with a current sensing means and an angle control device. In an inverter station, however, this means is suitably provided with a marginal adjustment in relation to the adjustment of the rectifier station, so that this means first functions when the transmission current falls below the margin set in the rectifier station by a certain amount.

In the case now described it has been pointed out that the transmission current could not flow, and the current control of the inverter station thus comes into operation. In this way the two converter stations exchange roles so that the rectifier side is controlled with a minimum delay angle and thus may be regarded as program-controlled, while the inverter side is current-controlled.

Under these circumstances, it is desirable that the rectifier station gives as much as possible, that is, that the voltage regulation moves to its upper position and its delay angle becomes zero.

On the other hand it is not desirable that the voltage regulation of the inverter station moves to its upper position since this would cause an inconvenient starting point for continued regulation. For this reason the contact E in FIGURE 3 is provided. This is inserted in a relay controlled by the current regulation of the inverter station in such a way that, when the output voltage of the current regulator exceeds zero, the relay is energized and breaks the contact E. In this way the voltage regulator of the inverter station will remain in a position suitable for controlling.

If it is the rectifier station which is normally program-controlled and the inverter station which is current-controlled, the process described above will be reversed and, inter alia, the voltage regulation on both the stations will tend to move to the lower position.

I claim:
1. A high voltage direct current power transmission system connecting two A.C. networks and comprising a D.C. transmission line and a converter station at each end of said line; each converter station being provided with a rectifier connection and a first control means for said connection; said first control means including means for providing the rectifiers of said rectifier connection with control pulses with a certain delay angle; said first control means in a first of said stations having an input circuit settable to a certain desired value of a certain transmission magnitude; said first control means in the second of said stations being controlled in accordance with a certain programme involving a certain minimum or maximum value of said delay angles corresponding to rectifier or inverter operations, respectively, of said second station; on station;

said power transmission system being characterized in that:

in each of said stations said rectifier connection has an A.C. side connected to the A.C. voltage of said A.C. network; each station includes a further control means for controlling said A.C. voltage connected to the A.C. side of said rectifier connection; said further control means having an input side; means in said first station for measuring the delay angles of the rectifiers of the station; the input side of said further control means of said station being connected to said delay angle measuring means and controlled from said means in response to the deviation of said delay angles from a certain desired value of said delay angles; means in said second station for measuring the direct voltage of said transmission line; the input side of said further control means of said second station being connected to said direct voltage measuring means and controlled from said means in response to the deviation of said direct voltage from a certain desired value of said direct voltage.

2. High voltage direct current transmission system as claimed in claim 1, said converter stations having converter transformers with tap selectors; said tap selectors constituting a part of the further control of the stations.

3. High voltage direct current transmission system as claimed in claim 1, the D.C. voltage measuring means in said second station having controllable sensitivity; said station comprising a plurality of series-connected converters, and means responsive to the number of active series-connected converters in the station to control said sensitivity.

4. High voltage direct current transmission system as claimed in claim 1, the D.C. voltage measuring means in said second station having controllable sensitivity; and means for adjusting said sensitivity in dependence on whether the station operates as rectifier or as inverter.

5. High voltage direct current transmission system as claimed in claim 1, disconnecting means in the second station for disconnecting the D.C. voltage measuring means from the further control means; means responsive to abnormal operation conditions to cause said station to pass from program control to control of a line variable; said last means activating said disconnecting means.

References Cited
UNITED STATES PATENTS

| | | | |
|---|---|---|---|
| 2,407,072 | 9/1946 | Gittis | 321—2 |
| 2,419,466 | 4/1947 | Willis | 321—2 |
| 2,435,187 | 2/1948 | Bedford | 321—2 |

ORIS L. RADER, *Primary Examiner.*

T. J. MADDEN, *Assistant Examiner.*